June 8, 1965    J. D. BERNSTEIN ETAL    3,188,135
RIGID REAR WINDOW FOR CONVERTIBLE AUTOMOBILE
Filed Aug. 29, 1963    3 Sheets-Sheet 1

INVENTORS.
Joseph D. Bernstein
BY Dean Mainard
BY Frank C. Lowe
ATTORNEY

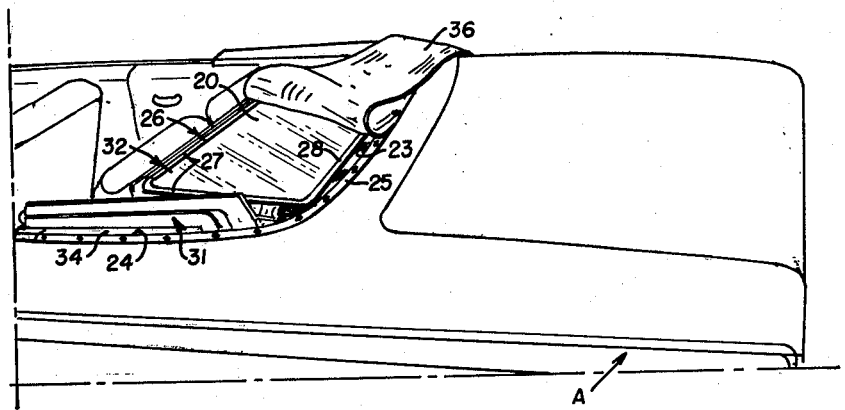
Fig. 4
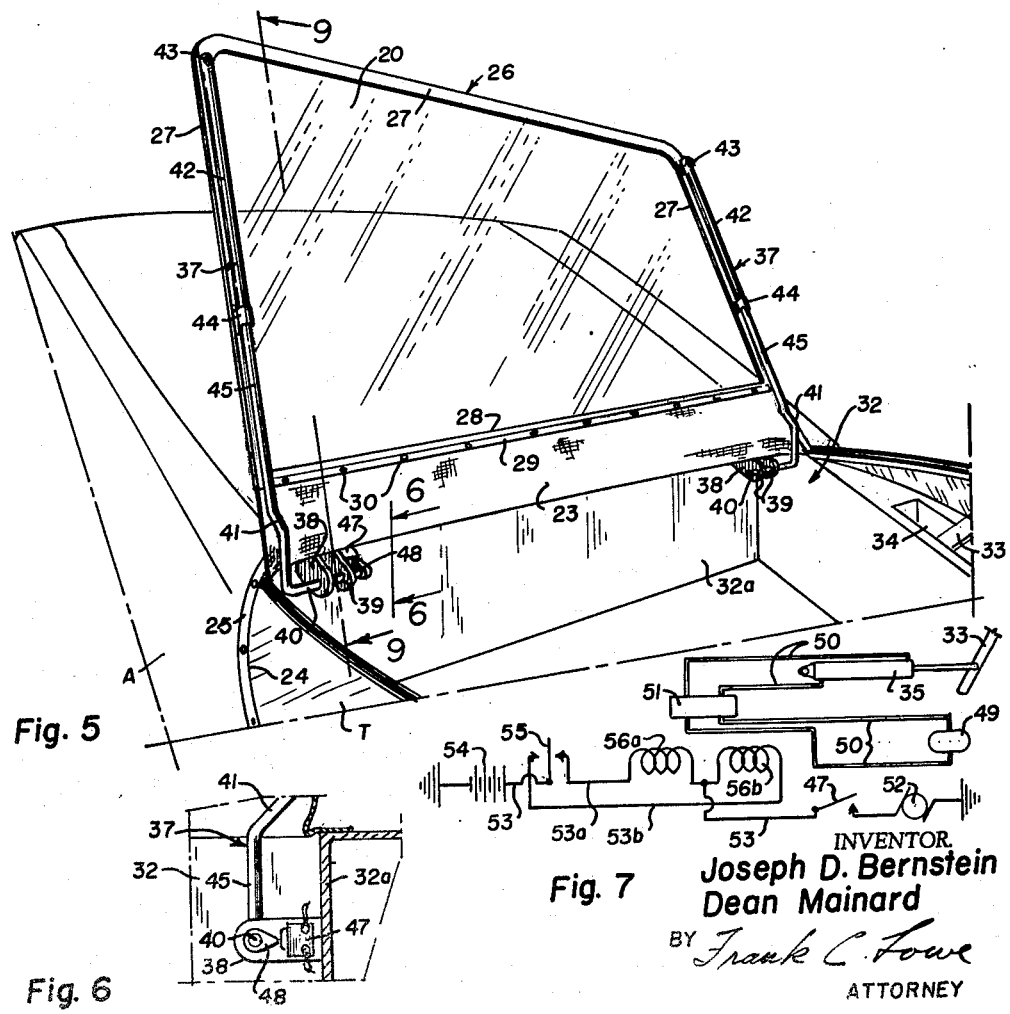
Fig. 5
Fig. 6
Fig. 7
INVENTOR.
Joseph D. Bernstein
Dean Mainard
BY Frank C. Lowe
ATTORNEY

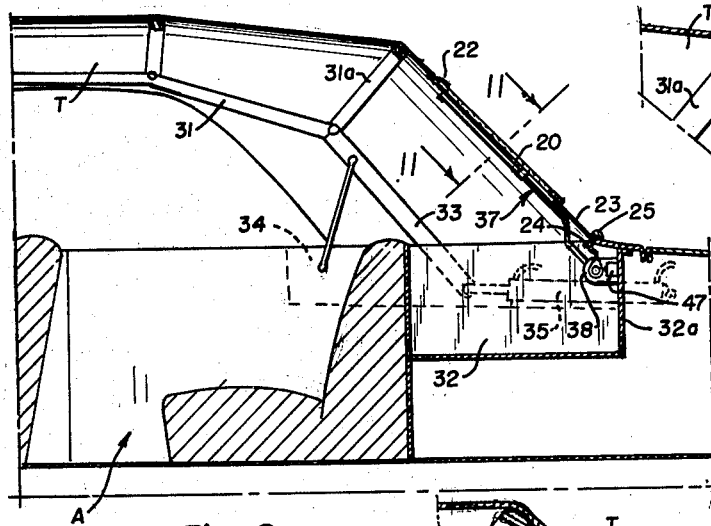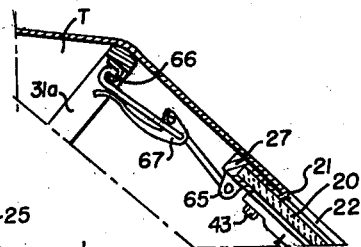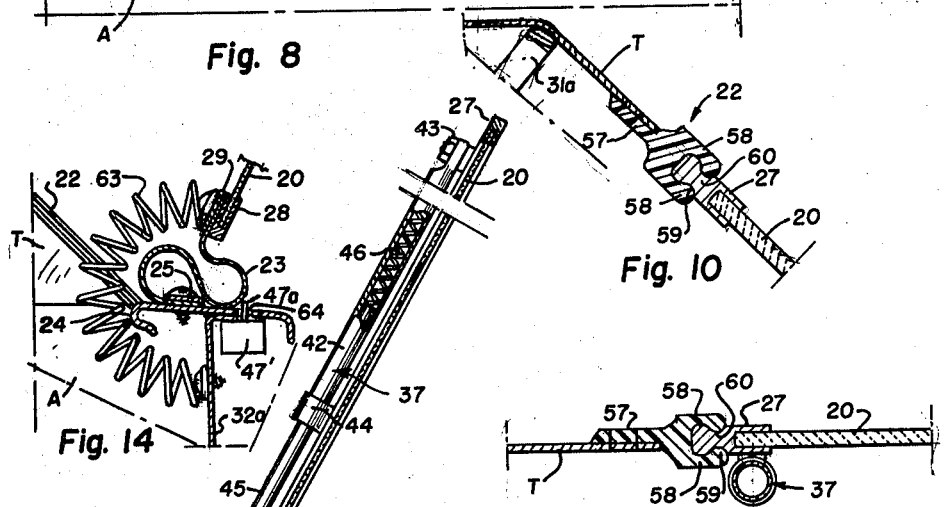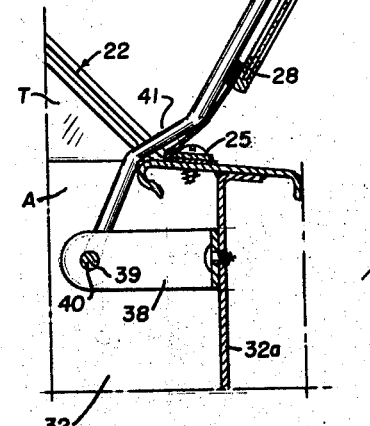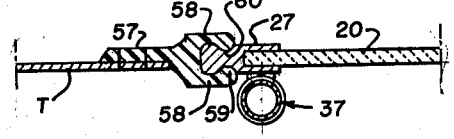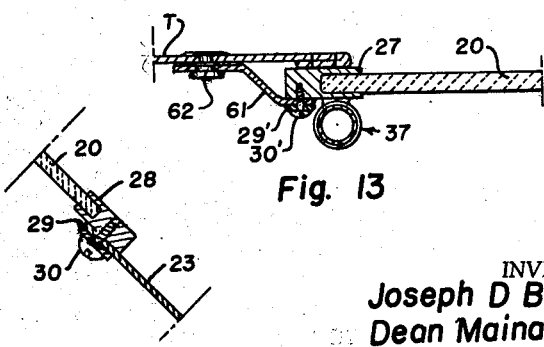

United States Patent Office 3,188,135
Patented June 8, 1965

3,188,135
RIGID REAR WINDOW FOR CONVERTIBLE
AUTOMOBILE
Joseph D. Bernstein and Dean Mainard, Denver, Colo.,
assignors to The Beverley Development Corporation, a
corporation of Colorado
Filed Aug. 29, 1963, Ser. No. 305,457
11 Claims. (Cl. 296—117)

This invention relates to the top construction for convertible type automobiles and more particularly to the rear window arrangements therefor, a primary object of the invention being to provide a novel and improved retractible top for a convertible automobile which includes a rigid rear window.

The modern convertible automobile is provided with a fabric top carried upon a collapsible frame. A mechanized means is provided for folding-up the frame and top and lowering it into a transversely disposed well in the automobile body which is located behind the rear seat thereof. The folding of the frame automatically creases and folds the fabric top into a compact arrangement which does not require special attention during the folding and retraction operation. It follows that with a modern mechanized unit, it is merely necessary to disconnect the front end of the top from the windshield structure of the automobile and to then press a button to start a motor which initiates and completes the retraction of the top. Another button may be pressed to extend the top, or a push-pull switch may be used.

The rear window of a convertible automobile is commonly made of a tough flexible sheet of transparent synthetic resin such as clear vinyl sheeting or the like. This material may be folded almost as easily as the fabric from which the top cover is made. Thus, it is a common practice in folding-up and retracting the top to also fold the window as if it were part of the top fabric. However, this is not entirely satisfactory for even the toughest synethetic resin sheet will crease, crack and break after it is repeatedly folded. For this reason, it has been found more desirable to disconnect the rear window portion from the remainder of the fabric top and to place it into the retaining well before folding and retracting the top, such precautions being desirable in order to preserve the window and increase its life.

Even with such precaution, the rear window of the retractible top is usually the first component which has to be replaced. The material from which it is made, a flexible, transparent vinyl sheeting or the like will easily mar, become soiled, and after a period of exposure to sun and weather become brittle and fade to a brown color. Other known types of transparent, flexible sheets are no better than the vinyl used for this purpose.

It follows that there is real and definite need for an improved rear window construction in a convertible automobile and especially a need for a rear window which will last longer. This need has been especially felt in the more recent models of automobiles which are designed with larger and wider windows to provide a better field of vision for the driver and passengers.

Obviously, a more suitable material for an automobile window is a rigid sheet of glass or even a rigid type of resin sheeting which is of better quality than that possible to obtain in flexible resin sheets. If glass is used, it may even be tempered, or it may be a reinforced type of safety glass. Rigid resin sheets of the types known as Lucite or Plexiglas also have excellent qualities of transparency and are desirable for this purpose. However, it has generally been conceded that glass or other rigid material cannot be used for the rear window in a convertible automobile because of the folding problem involved in retracting the top into its retainer well.

The present invention was conceived and developed with the above considerations in view, and it comprises, in essence, a rigid rear window for the retractible top for a convertible automobile, which is suspended and carried on the automobile body in a manner which permits it to be effectively held in place in the opening in the fabric top when it is in use, but to be detached and swung aside when the top is being detracted.

It follows that another object of the invention is to provide a novel and improved rigid rear window for the top of a convertible automobile which is adapted to fit snugly in position in the top when the automobile top is extended, which is adapted to be easily disengaged and shifted away from the top framework when the top is being retracted and which is also adapted to be swung into the retaining well after the top is fully retracted therein.

Another object of the invention is to provide a retractible top construction for a convertible automobile including a rigid rear window of glass or the like which substantially improves the rearward visibility of the occupants and driver of the automobile.

Another object of the invention is to provide a retractible top construction for a convertible automobile including a rigid rear window structure which is carried on the automobile in a swingable and extensible manner, whereby it is adapted to be extended to fit into the rear opening of the top, swing rearwardly away from the top when the top is being retracted and shifted and placed in the top-retainer well of the automobile whenever desired, with the combined swinging, extension and retraction operations being in a natural sequence.

Another object of the invention is to provide a retractible top construction on a convertible automobile including a rigid rear window structure which is operatively arranged in a sequential manner adapted to permit the retracted top and window to lie in a neat, compact arrangement within the well when it is retracted and which includes further, a safety arrangement to insure that the top and window will be retracted in a proper sequence without the danger of damaging the components, thereof.

Other objects of the invention are to provide, in combination with a retractible top for a convertible automobile, a rigid rear window section and suspension and holding means therefor, which is a low-cost, neat-appearing, rugged and durable unit.

With the foregoing and other objects in view, all of which more fully hereinafter appear, our invention comprises certain novel constructions, combinations and arrangements of parts and elements as hereinafter described, defined in the appended claims and illustrated in the accompanying drawing in which:

FIGURE 4 is a perspective view of the rear portion of the automobile shown at FIGS. 1, 2, and 3, but from yet another position and showing the top as being completely retracted into its pocket, the rear window being laid thereover in its retracted position and with a protective cover partially enclosing the retracted top and window within the pocket.

FIGURE 5 is a perspective view of the rear window in its swung-back position viewed substantially from the indicated arrow 5 at FIG. 2 but on an enlarged scale.

FIGURE 6 is a fragmentary sectional detail as taken substantially from the indicated line 6—6 at FIG. 5, but on an enlarged scale.

FIGURE 7 is a circuit diagram of one arrangement of electrical controls which may be used with the top retracting mechanism, and including a safety switch arrangement according to the invention.

FIGURE 8 is a diagrammatic, longitudinal sectional view of a portion of the automobile body and top structure, as taken substantially from the indicated line 8—8 at FIG. 1, but on an enlarged scale.

FIGURE 9 is a fragmentary, sectional detail as taken from the indicated line 9—9 at FIG. 5, but on a further enlarged scale and with a portion being broken away to conserve space.

FIGURE 10 is a fragmentary sectional detail as taken from the indicated line 10—10 at FIG. 1.

FIGURE 11 is a fragmentary sectional detail as taken from the indicated line 11—11 at FIG. 8 but on an enlarged scale.

FIGURE 12 is a fragmentary sectional detail as taken from the indicated line 12—12 at FIG. 1, but on an enlarged scale.

FIGURE 13 is a fragmentary sectional detail similar to FIG. 11, but showing an alternate construction.

FIGURE 14 is a fragmentary sectional detail similar to a portion of the showing at FIG. 9, but showing an alternate construction thereof.

FIGURE 15 is a fragmentary sectional detail similar to FIG. 10, but showing an alternate construction.

Figure 1:
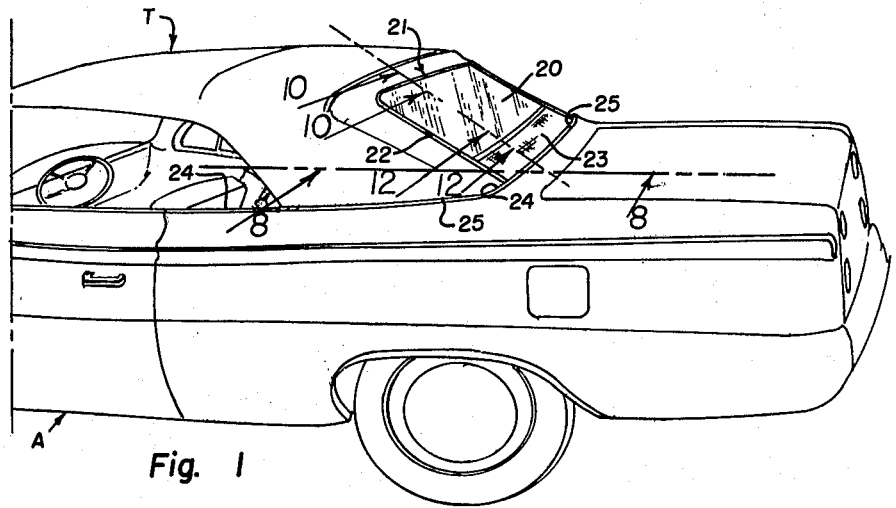
FIGURE 1 is a perspective view of the rear portion of a convertible automobile having the top extended and having the improved rear window mounted therein as in position for normal use when the top is extended over the automobile.

Referring more particularly to the drawing, FIG. 1, thereof shows the improved, rigid rear window 20 in position in the extended top T of a convertible type automobile A, such being in appearance much the same as an arrangement with a conventional top and window. The improved window is suspended in an opening 21 in the fabrics of the top T with the fabric including an edge trim 22 about the top and sides of the opening 21 which fits over the sides and top of the window to provide for a weatherproof fit as will be hereinafter further described.

A base web 23 of fabric between the bottom of the window and top of the automobile body is permanently attached to the bottom edge of the window and the lower edge of this web 23 is attached to back portion of the curved rim edge 24 of the passenger compartment of the automobile, by a fastener strip 25. Accordingly, this base web 23 forms a continuation of the rearward portion of the sides and back of the fabric top which are permanently affixed to the edge 24 of the passenger compartment of the automobile rearwardly of the rear seats thereof as by the strip 25.

Figure 2:
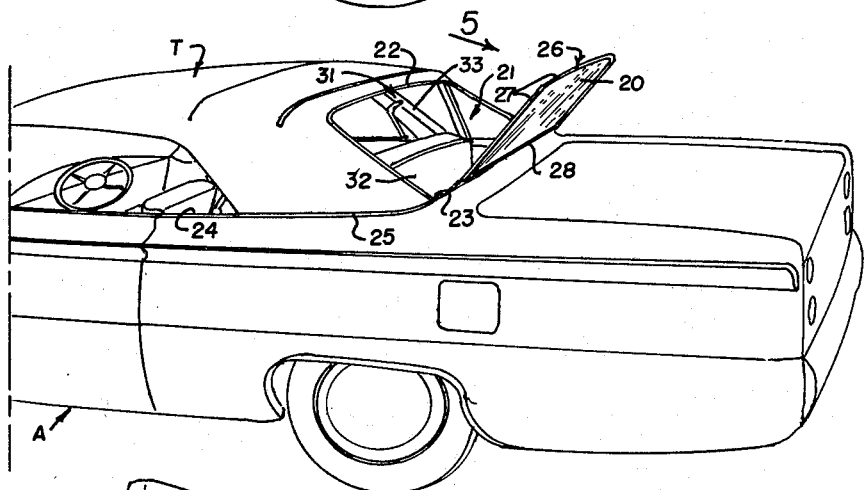
FIGURE 2 is a perspective view of the rear portion of the automobile as shown at FIG. 1 as from a slightly different position, and with the rear window section being swung rearwardly and away from engagement with the retractible top, as in a preliminary step of retracting the top of the automobile.
Figure 3:
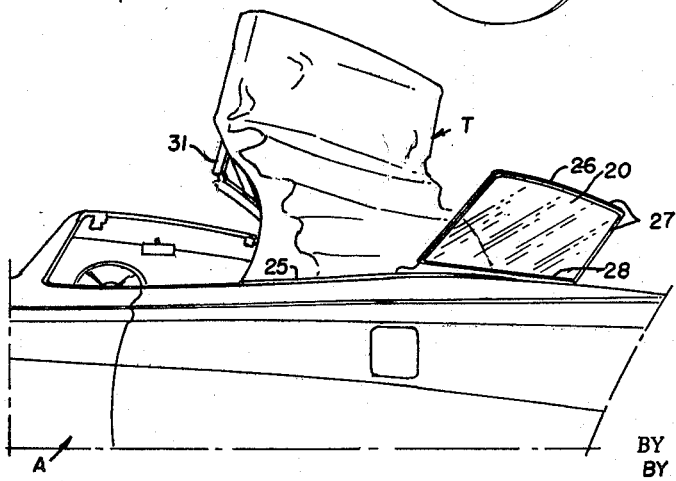
FIGURE 3 is a perspective view of the rear portion of the automobile at FIGS. 1 and 2 from another slightly different position and illustrating the retraction of the automobile top itself and with the rear window remaining out of the way.

The side portions of this base strip 23 are not attached to the fabric of the top but are adapted to be fitted into the lower reaches of the edge trim members 22 the same as the sides of the window itself. This fabric base web 23 thus serves two functions, first to fill the gap between the bottom edge of the window and the body of the automobile and secondly, to provide a flexible connecting medium between the window and the car body to permit the window to be easily swung rearwardly and away from the top and to an out-of-the-way position when retraction of the top commences as illustrated at FIGS. 2 and 3. It is to be noted that the back portion of the compartment edge 24 is curved and arched, and although the window 20 may be either flat or formed in a similar arched shape, it is clearly apparent that a fixed hinging means cannot be used to swing the window in its out-of-the-way position.

The rigid window 20 is preferably a flat sheet of glass formed to the shape of the opening 21 at the rear of the fabric top T, and as such, it may be encased in a frame 26 which is preferably formed as a comparatively narrow, neat-appearing U-shaped edging strip 27 along the top and at the side edges, the glass and a heavier edging strip 28 along the bottom edge thereof, the edging 28 including an inner side surface whereto the upper edge of the fabric base web 23 may be fastened and held in position by a holding strip 29 affixed to the edging 28 by suitable screws, 30. A waterproof adhesive may also supplement this attachment of web 23 to the glass.

Where the window 20 is made of tempered or safety glass, it may not be necessary to use the edging 27 along the top and side edges of the glass although the bottom edging 28 will be required to attach the web 23. Also, a means must be provided for connecting a supporting hinge arrangement which will be hereinafter described. Where the window 20 is made of a rigid plastic sheet, for example an acrylic type such as commercial types marketed under the trade names of Lucite and Plexiglas, the edging 27 and also the edging 28 may be simplified or even eliminated if desired, for such plastic material is easily worked and other substances such as the edge of the web 23 may be connected thereto as by glues and solvents or by processes such as thermawelding.

Steps in the retraction of the top of a convertible automobile having a rigid rear window are illustrated at FIGS. 2 through 4. The operation commences by removing the window 20 from its opening in the top T and swinging it outwardly and out of the way to permit the top to retract first. The conventional framework 31 carrying the retractible top is adapted to collapse and drop into a transversely disposed well 32 in the body of the car immediately back of the rear seats. This arrangement is not changed in the present invention. The fabric top T carried by this framework 31 is attached to the various members thereof in a manner and folds upon itself in an accordion-like manner as the framework is collapsed and dropped into the well. The framework includes a primary member 33 at each side of the automobile which is partially carried in a pocket section 34 alongside each side of the well to swing back and forth to extend and retract the top. Each member 33 is swung by an actuator-piston-cylinder 35 which is located within each pocket 34 all as shown in broken lines at FIG. 8. It is to be noted that this actuator-piston-cylinder 35 will be operated by closing circuits with a control switch as will be further described.

After the top T is folded and dropped into the well 32, the window 20 may then be swung forwardly and into the well to lie over the folded top as in the manner clearly illustrated at FIG. 4. To complete the retraction, a protective cover 36 may then be fastened over the well in a conventional manner.

To control and restrict the swinging movement of the window and to facilitate holding the window in its several positions, an arm 37 is affixed to each side of the window as upon the side portions of the frame strip 27. Each arm extends downwardly into the retraction well 32 and adjacent to the rear wall thereof to be supported by a hinge 38. Each hinge 38 is formed as a U-shaped bracket outstanding from the rear wall of the well. Bearing orifices 39 extend through each leg of each bracket and these orifices are aligned on a common transverse axis. Each bracket thus holds an inturned end 40 of an arm 37 in its bearing orifices. It is to be noted that because of the curved rim edge 24, the rear wall 32a of the well 32 extends underneath the rear portion of this edge 24 and to provide for clearance at all positions, the lower portion of each arm 37 is angled as at 41 to easily reach around the rim edge 24 of the body as illustrated at FIG. 9.

Each support arm 37 is constructed as a telescopic member to permit the window to shift its position with respect to its distance from the hinge axis as well as to swing about the axis. In the construction illustrated, each arm 37 includes a holding tube 42 affixed to a side 27 of the window frame as by a connective bolt 43 at its top and by a ring 44 at its lower end. A rod 45 is slidably and telescopically carried within this tube 42 to form the lower portion of the arm 37 heretofore described. To counterbalance the weight of the window 20, a compression spring 46 may be fitted into the tube 42 to press against the rod 45. It is to be noted that this spring is not an essential component to the operation of the assembly and it may be dispensed with, especially where a lightweight window construction of a synthetic resin sheet is used. When a heavier glass window is used it is desirable.

It follows that with a pivoted, telescopically-extendible, spring-loaded support arm 37 at each end of the window, the window may be swung back and forth on the hinge bracket 38 and slid towards or away from the brackets as is necessary for its different positions. For example, it will have to be a substantial distance away from the hinge point when the top T is extended and the window 20 is in place in the top opening 21. On the other hand, the window will have to be comparatively close to the hinge point when the assembly is lying in the retraction well 32 in the body of the automobile.

It is manifest that this window must be swung out of the way whenever the top T is folded and dropped into the retainer well 32. If the window were inadvertently swung into the well 32 prior to folding and retraction of the top, the window could be broken or otherwise damaged. Accordingly, a safety means is provided which acts to prevent retraction of the top until the rear window is properly positioned and out of the way of the top movement. A preferred and simple arrangement of a safety means is a switch 47 which is located in the circuit controlling the retraction and extension of the top, as will be described. The switch 47 is normally open and when open will not permit the retraction-extension mechanisms to operate. It is adapted to close only when the window is swung rearwardly in the out-of-the-way position as illustrated at FIGS. 2 and 5.

In the arrangement illustrated, the switch 47 may be mounted upon a bracket 38 alongside a rotatable arm end 40. The arm end includes a cam 48 which is adapted to swing against the switch and to close as the window is swung to its rearward position, as in the manner illustrated at FIG. 6.

An exemplary arrangement of the mechanisms and circuits which operate the extension and retraction of the top T are diagrammatically illustrated at FIG. 7. The primary retraction member 33 is connected to actuating-piston-cylinder 35. The hydraulic system which operates cylinder 35 includes a pump 49, intake and pressure lines 50 from the pump to a 4-way, solenoid operated control valve 51 and the lines 50 extend thence to each end of the cylinder 35.

The pump 49 is driven by a motor 52 powered through an electric circuit 53 by a battery 54, or the like. A two-way switch 55 is mounted in circuit 53, with the circuit being divided into two leads at this switch, a first lead 53a as for extension movement and a second lead 53b as for retraction movement. The leads 53a and 53b include solenoids 56a and 56b which operate the 4-way valve 51. Thence, the leads join and the circuit 53 connects with the motor 52 to complete the conventional assembly.

In the present invention, however, the normally open switch 47 may be interposed in the lead 53 as next to the motor to prevent operation of the above described mechanisms until the cam 48 is rotated to close the switch, as by swinging the window 20 out of the way, as described.

The window 20 is suspended in the opening 21 of the top T whenever the top is in its extended position and the edge trim 22 may be adapted to hold the window in place with a snug, substantially-leakproof fit which, however, may be released when desired. One manner of forming this trim is illustrated at FIGS. 10 and 11. The trim 22 is formed of resilient, rubber-like material which is roughly Y-shaped in section. The leg 57 of the Y is stitched, cemented or otherwise attached to the fabric forming the top T. The arms 58 of the Y thus outstand to grip the edges 27 or the sides and top of the window and the side edges of the base web 23 which is attached to the window. To facilitate the holding of the arms 58 about the window edges 27, the ends of the arms may be formed as rounded heads 59 which fit into grooves 60 in the edge strips 27 as in the manner illustrated at FIGS. 10 and 11.

A number of variations of constructions for holding the window in place are possible, and an alternate construction is illustrated at FIG. 13 where an edging or fly 61 is attached to the side and top edges of the frame 27, or to the sides and top of the window if frame is not used, and also to the sides of the base web 23. This edging may be attached by a strip 29' and bolts 30' or by glue or in other suitable manner similar to that hereinbefore described. When placing the window in position in the opening 21 of the top, this edging 61 may outstand from the sides and top of the window to lie against the inner face of the fabric of the top T, and it may be fastened thereto in any suitable manner as by snap fasteners 62. Other equivalent fastening means would include zippers, contact fastening strips, such as VelCro and the like.

A further modification of the structure is illustrated at FIG. 14 where a coiled spring 63 is used to hold the window 20. This spring may be used in lieu of the hinge arrangement heretofore described where the window is formed of light-weight material such as a resin sheet. One end of the spring is secured to the rear wall 32a of the well 32 to outstand therefrom while the other end is secured to the base of the window, or its frame 28. This causes the spring to arch about the body opening edge 24 when the window is swung back from the top as illustrated at FIG. 14 and at the same time controls its positioning.

The safety switch 47' must be placed in a position where it may be closed when the window is swung rearwardly. The switch 47' may be mounted within the body of the automobile behind the opening edge 24 with its plunger 47a extending upwardly through an orifice 64 in the body. When swung backwardly, the window and web 23 will be pressed against the automobile body back of the opening edge 24 to depress the plunger 47a and close the switch.

A further modification of the structure is illustrated at FIG. 15, where the window 20 is pulled upwardly and is secured to the rear bow member 31a of the framework 31 with the top edge of opening 21 overlapping the window and with a connective edge trim 22, or the like, being only at the sides of the opening. In this arrangement a bracket 65 is affixed to the top edge 27 of the window and a hook-like bracket 66 is affixed to the rear bow member 31a to receive the hook of a toggle connector 67 which is secured to the bracket 65 as illustrated. In this arrangement, a pair of toggle connectors 67 is used with each connector being located at a side of the window near each corner thereof. The fitting of the toggle connectors may be such that the pull of the spaced pair holds the window in place and tightly stretches the base web 23, all to provide a neat-appearing, taut arrangement when the window is in place.

We have now described our invention in considerable detail, however, it is obvious that others can build and devise constructions which are nevertheless within the spirit and scope of the invention. Hence, we desire that our invention be limited, not by the construction illustrated and described, but only by the proper scope of the appended claims.

We claim:

1. In a convertible automobile having a fabric top structure extended over the passenger section of the automobile with an open rear section carried upon a framework which is adapted to be collapsed, folded rearwardly, and to drop into a well in the automobile body at the rearward portion of the passenger compartment to retract the top, a rigid rear window formed of glass or like material, normally encased within the rear section opening of the fabric top when the top is extended, but being releasable therefrom when the top is to be retracted, and a supporting hinging means at the rearward edge of said well connecting with the window and being adapted to support the window, permit the window to be held within the encasement of the fabric top when the top is extended, permit the window to be swung rearwardly of the well, so that the top may be folded and lowered into the well without interference by the window, and permit the window to be subsequently swung into the well over and upon the folded top therein.

2. In the organization defined in claim 1, wherein said top structure includes a transverse rear-bow framework member which is disposed above and forwardly of the rear window when the frame is extended and means adjacent to the upper edge of the window adapted to secure the window to said rear bow framework member.

3. In the organization defined in claim 2, wherein said securing means includes a toggle means adapted to pull the window towards said bow member.

4. In the organization defined in claim 1, including a transversely disposed base web having one side edge affixed to the lower edge of the window and its opposite, side edge affixed to the rear transverse edge of the passenger compartment at the rear side of the well.

5. In the organization defined in claim 1, including a transversely disposed base web having one edge affixed to the lower edge of the window and the other edge affixed to the rear transverse edge of the passenger compartment of the automobile, wherein said top structure includes a transverse rear bow framework member disposed above and forwardly of the normal position of the window when positioned within the fabric top and a toggle means adjacent to the upper edge of the window adapted to pull the window towards said bow member and to stretch said base web taut.

6. In the organization defined in claim 1, including a transversely disposed base web having one edge affixed to the lower edge of the window and the other edge affixed to the rear transverse edge of the passenger compartment, means adapted to stretch said base web to a substantially taut position when said window is positioned in said fabric top, and wherein said hinging means includes pivots in the well adjacent to the rearward edge thereof and at each side of the window and a pair of arms extending therefrom and connecting with the sides of the window, whereby to dispose the window above the hinge means pivot.

7. In the organization defined in claim 6, wherein said arms are telescopically extensible, whereby to extend in length and to permit the said stretching means to stretch the base web.

8. In the organization defined in claim 1, wherein said hinging means includes a pivot means in the well adjacent to the rearward edge thereof at each side of the window, an arm extending from each pivot means, a tube affixed to each side of the window to telescopically receive each arm, and a spring means within each tube abutting against the end of an arm, whereby to resiliently support the window on said arms.

9. In the organization defined in claim 1, wherein said hinging means comprises a coiled spring affixed to the rear wall of said well and to the inner face side of the window.

10. In the organization defined in claim 1, wherein said framework includes mechanical means adapted to mechanically retract said top and to drop it into said well and safety means associated with said window and associated with said mechanical means adapted to prevent operation of said mechanical means until said window is swung rearwardly from the rearward edge of the well, whereby to permit the top to retract when the window is out of the way of the top movement.

11. In the organizaiton defined in claim 1, wherein said top framework includes mechanical means adapted to mechanically extend and retract said top to and from said well, and an electrical circuit adapted to be closed to actuate said mechanical means, a normally open switch in said circuit adjacent to said window having a closing actuator contact means adapted to be contacted when said window is swung rearwardly, whereby to close said switch and permit operation of said mechanical means with the window at its rearwardly swung position.

References Cited by the Examiner

UNITED STATES PATENTS

| | | | |
|---|---|---|---|
| 2,189,138 | 2/40 | Eichner | 296—145 |
| 2,495,022 | 1/50 | Robbins | 296—145 |
| 2,793,907 | 5/57 | Hess et al. | 296—44 |
| 3,026,133 | 3/62 | Swanson | 292—113 |
| 3,030,140 | 4/62 | Probst | 296—107 |
| 3,091,494 | 5/63 | Cohen | 296—137 |

FOREIGN PATENTS 545,657 9/57 Canada.

A. HARRY LEVY, *Primary Examiner.*